Feb. 25, 1930. C. L. KNOPF 1,748,513
GEAR LUBRICANT TESTING MACHINE
Filed Aug. 18, 1928 2 Sheets-Sheet 1

INVENTOR
Carl L. Knopf
BY
ATTORNEYS

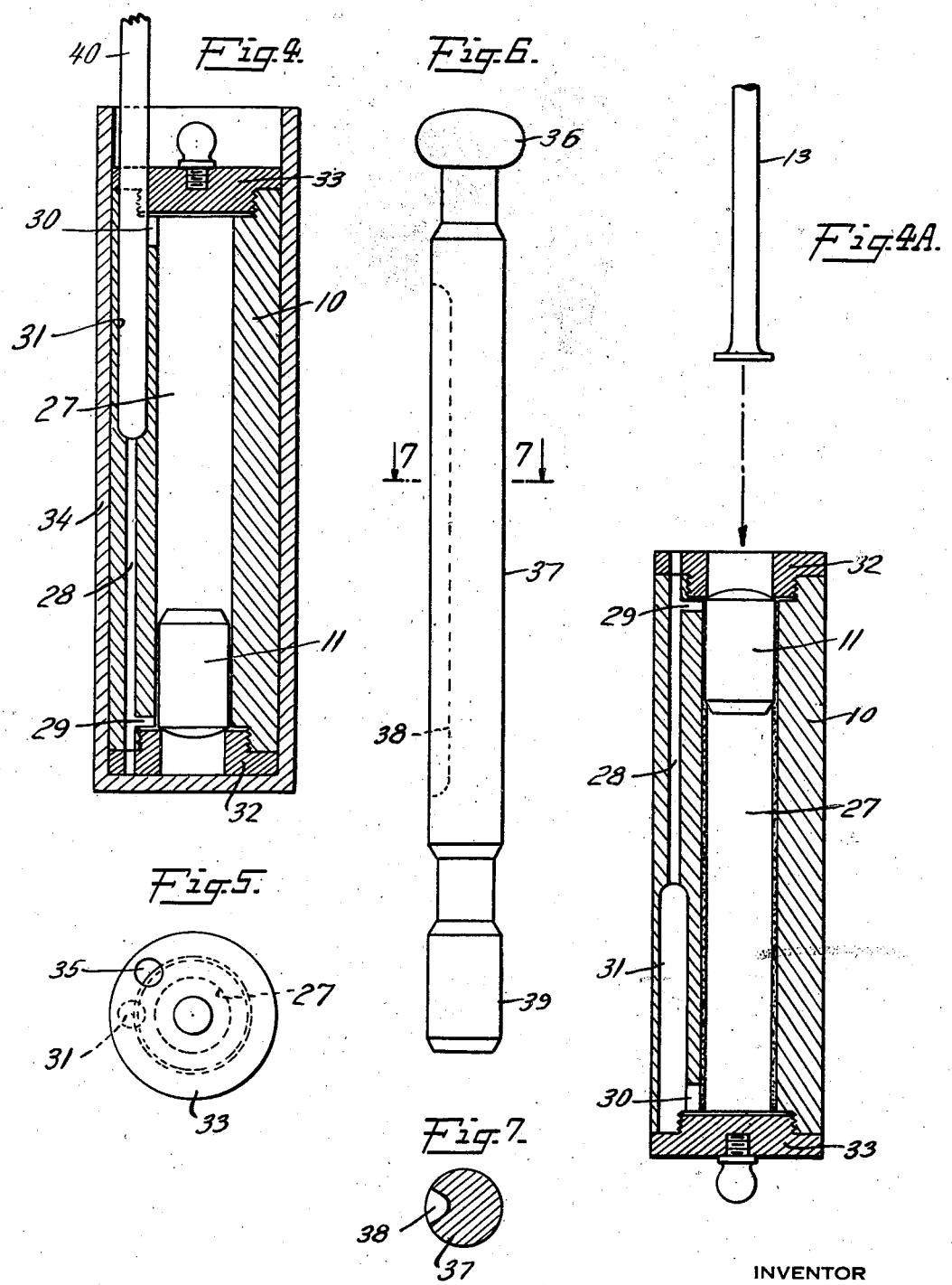

Patented Feb. 25, 1930

1,748,513

UNITED STATES PATENT OFFICE

CARL L. KNOPF, OF CHICAGO, ILLINOIS, ASSIGNOR TO SINCLAIR REFINING COMPANY, OF NEW YORK, N. Y., A CORPORATION OF MAINE

GEAR LUBRICANT-TESTING MACHINE

Application filed August 18, 1928. Serial No. 300,540.

This invention relates to an improved instrument for testing lubricants. This instrument is particularly useful for measuring the adhesiveness of lubricants, particularly at low temperatures, and may therefore be called an adherometer.

Several peculiar problems are involved in the lubrication of transmissions and differentials in automobile machinery, particularly because of the wide range of temperature over which such machinery is operated. The improved instrument of this invention is of special value and application in the determination of the characteristics of lubricants intended for such use at low temperature, in the neighborhood of 0° F. for example. This instrument makes possible a direct and reliably accurate determination of the adhesiveness of lubricants at such temperatures.

The instrument of the invention comprises essentially a cylindrical receptacle adapted to receive interiorly a film of fixed thickness of the lubricant to be tested, a cylindrical plunger of external diameter slightly less than the internal diameter of the receptacle, weighted means for driving the plunger through the receptacle, means for limiting the rate of motion of the driving means, a weighing mechanism, and means carried by the weighing mechanism for receiving and holding the receptacle in the path of motion of the plunger. The instrument indicates directly the shearing force exerted by the plunger in moving through the receptacle under standardized conditions.

Figure 1:
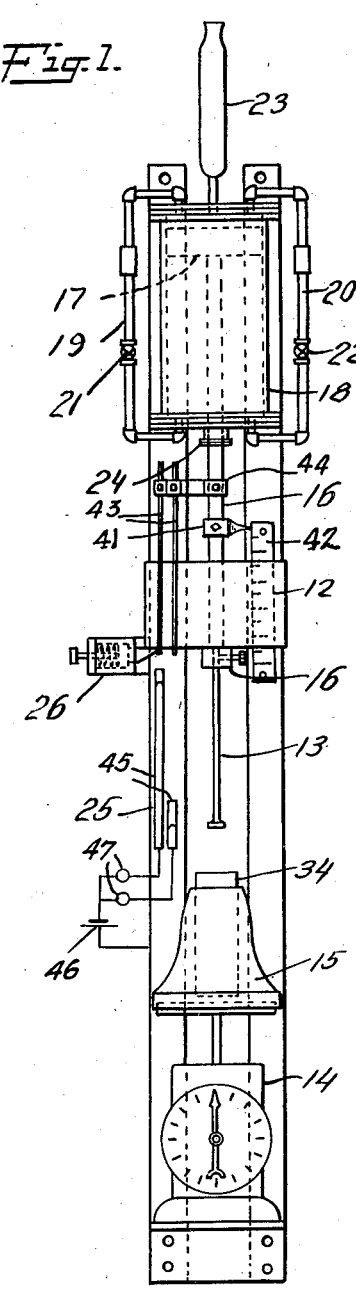
Figure 2:
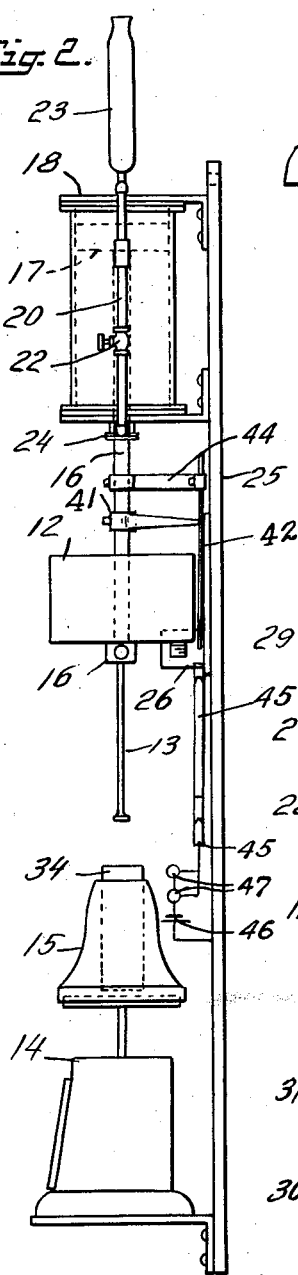
Figure 3:
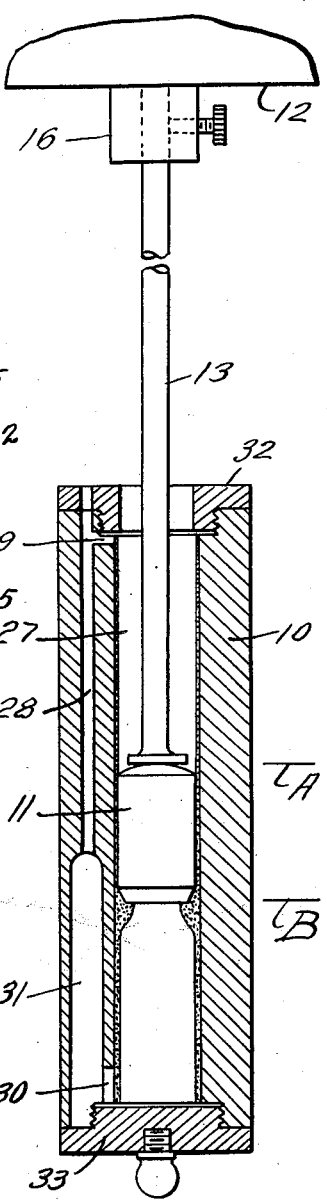

One form of instrument embodying the invention is illustrated in the accompanying drawings, and the invention and its operation will be further described in more detail in connection therewith, but it is intended and will be understood that this detailed illustration and description are for the purpose of exemplification and that the invention is not limited thereto. In the accompanying drawings Fig. 1 is a front elevation of an assembled instrument, Fig. 2 is a side elevation of an assembled instrument, Fig. 3 is a fragmentary detail showing particularly the receptacle and the plunger in operating condition, Fig. 4 is another detail, in section, of the receptacle, Fig. 4ª is still another detail, in section, of the receptacle, Fig. 5 is a plan view of the covered end of the receptacle, Fig. 6 is an elevation of a lubricating pin for supplying a film of fixed thickness of the lubricant to be tested to the interior of the receptacle, and Fig. 7 is a section on line 7—7 of Fig. 6.

The instrument illustrated in the drawings comprises a cylindrical receptacle 10 adapted to receive interiorly a film of fixed thickness of the lubricant to be tested, a cylindrical plunger 11 of external diameter slightly less than the internal diameter of the receptacle, a weight 12 for driving the plunger 11 through the receptacle 10 by means of a push rod 13, a weighing mechanism 14 and means 15 for receiving and holding the receptacle 10 in the path of motion of the plunger 11 and the push rod 13. The push rod 13 and the weight 12 are each attached to and carried by a shaft 16 connected to a piston 17 moving in the closed cylinder 18. The opposite ends of the cylinder 18 are connected by a pair of pipes 19 and 20, a gate valve 21 being provided in pipe 19 and a needle valve 22 in pipe 20. An open riser 23 is also connected to the upper end of the cylinder 18. The push rod 13 is guided by the shaft 16 which in turn is guided by the gland 24 and the piston 17. The cylinder 18 and the weighing mechanism 14 are carried by a unitary frame 25 adapted to maintain the parts of the instrument in definitely fixed position. A catch 26 is also provided for holding the push rod 13 and the driving mechanism in a raised position. The receiving and holding means 15 on the weighing mechanism advantageously includes or is in the form of a thermal insulating jacket. In the instrument illustrated, the receiving and holding means 15 is made of thermal insulating material.

The receptacle 10 comprises a cylinder with an accurately dimensioned bore 27, a vent opening 28 running through the wall of the receptacle and communicating with the ends of the bore through apertures 29 and 30, one end of the vent being enlarged to form a thermometer well 31, and removable end members 32 and 33 screw into seats in the ends of the cylinder. In operation, the test receptacle proper is inserted in a cup 34 (see Fig. 4). An aperture 35 is provided in the cover member 33 (see Fig. 5) which may be brought into alignment with the thermometer well 31 to permit the insertion of a thermometer or which may be turned past the end of the thermometer well to close this opening. The plunger 11 is accurately dimensioned to pass through the bore 27 with a small but fixed clearance, being of external diameter slightly less than the internal diameter of the bore. A lubricating pin 36 is provided for convenience in applying a uniform film of the lubricant to be tested to the interior of the bore 27 in the receptacle 10. This comprises a central portion 37 along which a groove 38 extends for applying the lubricant to the interior of the receptacle connected with a sizing plunger 39 accurately dimensioned to leave a film of predetermined thickness on the interior of the receptacle as the lubricating pin 36 is withdrawn.

In operation, the limiting rate of drop of the push rod 13 is first brought to a standard value by adjusting the needle valve 22 with the gate valve 21 closed, the cylinder 18 being filled with light lubricating oil, for example. For testing gear lubricants in a receptacle with a bore 4¼″ long and ⅝″ in diameter with a plunger 0.003″ less in diameter than the bore under a driving weight of about 50 pounds, the limiting rate of drop of the plunger may be fixed, with advantage, at 4″ in 26—27 seconds. The plunger may have a body portion ⅞″ long, an advancing end ⅛″ long, the edge of which is tapered at 30°, and an end adapted to contact with the push rod of spherical section on a ½″ radius. The foregoing dimensions, rates and weights have been used successfully.

In operation proper, the receptacle 10 with the plunger 11 within the bore is inserted in the cup 34 with a thermometer 40 in the well 31 and this assembly is then chilled to a standard temperature, 0° F. for example. The receptacle 10 is then removed from the cup, the end members 32 and 33 are unscrewed and the plunger removed, a film of the lubricant to be tested rapidly applied to the interior of the bore 27 in the receptacle 10 by passing the lubricating pin 36 therethrough, after coating the lubricating pin, the plunger 11 is also coated with the lubricant to be tested, the coated plunger is reinserted in the bore in the position shown in Fig. 4, the end members are replaced and the receptacle reinserted in the cup 34, and this assembly again chilled to a standard temperature, 0° F. for example. During this operation care is taken to minimize temperature rise of the test receptacle; it may be wrapped in an insulating cloth while out of the cup 34 for example. The sizing plunger on the lubricating pin is best dimensioned to leave a film slightly exceeding in thickness the clearance between the plunger 11 and the bore 27; the sizing plunger 39 for example may be dimensioned to leave a uniform film of 0.003″ thickness within the receptacle 10. When the receptacle 10 again reaches the standard temperature, the receptacle 10 is withdrawn from the cup 34, the thermometer 40 withdrawn and the thermometer well closed by turning the end member 33, the receptacle 10 then inserted with the ends reversed in the position shown in Fig. 4ª in the holder 15 and the push rod 13 released. As the plunger 11 is driven downwardly in the bore 27 in the receptacle 10, a load is imposed on the weighing mechanism which usually reaches a substantially constant value before the plunger has passed through any very great part of its travel. As soon as this value becomes constant, small weights equalling this force are placed on the large weight 12 to compensate for the resistance offered by the lubricant to the motion of the plunger 11. The vent 28 provides for the escape of air from beneath the plunger 11 thus avoiding back-pressure. A number of readings of the force imposed on the weighing mechanism by the travel of the plunger 11 through the bore 27 are then taken as the motion of the plunger continues. These readings may be averaged.

One convenient method of operation is to take a reading of the force imposed on the weighing mechanism shortly before the plunger reaches its midpoint of travel through the lubricant and shortly after it passes this point and to average these two readings. In Fig. 3, for example, readings may be taken as the plunger passes A and B, points ½″ above and ½″ below the midpoint, respectively. The time of reading may be determined with reference to an indicator 41 attached to the push rod or the driving mechanism and moving over a scale 42 or to an electrical contacting mechanism adapted to give a visible or audible signal as the plunger passes appropriate points in its travel. The electrical contacting mechanism may comprise, for example, a pair of rods 43 adjustably supported by the arm 44 from the shaft 16 and arranged to depend into mercury cups 45. The mercury cups may be supported by any suitable supporting means electrically insulated from the remainder of the apparatus. The mercury levels in the cups 45 may be differentially arranged so as to make contact at the desired points with the rods 43 as they travel downwardly with the shaft 16. The mercury cups may be electrically connected to the frame 25 through cell 46 and lamps 47. With the arrangement shown, the lamp circuits will be completed at different points in the downward travel of the shaft when the rods 43 make contact in the mercury cups. The lamps 47 may obviously be replaced by an electrically operable audible signalling device, if desired.

After the plunger stroke is completed, the push rod 13 is raised and the receptacle 10 then removed from the receiving and holding means on the weighing mechanism.

This improved instrument measures directly the shearing force which must be overcome by the plunger in moving through the bore under standardized conditions, the driving force impelling the plunger and the rate of motion of the plunger in particular, both being closely fixed.

I claim:

1. A lubricant testing instrument comprising a cylindrical receptacle adapted to receive interiorly a film of fixed thickness of the lubricant to be tested, a cylindrical plunger of external diameter slightly less than the internal diameter of the said receptacle, weighted means for driving the said plunger through the said receptacle, means for limiting the rate of motion of the driving means, a weighing mechanism, and means carried by the said weighing mechanism adapted to receive and to hold the said receptacle in the path of motion of the said plunger.

2. A lubricant testing instrument comprising a cylindrical receptacle adapted to receive interiorly a film of fixed thickness of the lubricant to be tested, a cylindrical plunger of external diameter slightly less than the internal diameter of the said receptacle, a vent from the space enclosed within the receptacle by the plunger when positioned therein, weighted means for driving the said plunger through the said receptacle, means for limiting the rate of motion of the driving means, a weighing mechanism, and means carried by the said weighing mechanism adapted to receive and to hold the said receptacle in the path of motion of the said plunger.

In testimony whereof I affix my signature.

CARL L. KNOPF.